United States Patent [19]

Tsunoda

[11] Patent Number: 4,607,198
[45] Date of Patent: Aug. 19, 1986

[54] WIPER DRIVING APPARATUS

[75] Inventor: Akira Tsunoda, Kosai, Japan

[73] Assignee: Asmo Co., Ltd., Japan

[21] Appl. No.: 684,618

[22] Filed: Dec. 21, 1984

[30] Foreign Application Priority Data

Dec. 29, 1983 [JP] Japan ............... 58-201546[U]

[51] Int. Cl.$^4$ ............................................... H02P 3/00
[52] U.S. Cl. ..................... 318/443; 318/442; 318/444; 318/441; 318/DIG. 2
[58] Field of Search ............... 318/441, 442, 443, 444, 318/445, 449, 450, 483, 641, 642, 643, DIG. 2, 466; 307/116, 117, 118

[56] References Cited

U.S. PATENT DOCUMENTS

| | | | |
|---|---|---|---|
| 2,841,994 | 7/1958 | Dyer et al. | 318/466 X |
| 3,529,227 | 9/1970 | Kearns | 318/443 |
| 3,691,443 | 9/1972 | Hammer et al. | 318/443 |
| 3,694,723 | 9/1972 | Schneider et al. | 318/443 |
| 3,728,603 | 4/1973 | Kearns | 318/443 |
| 3,849,711 | 11/1974 | Elliott et al. | 318/443 |
| 4,123,694 | 10/1978 | Andrei-Alexandru et al. | 318/DIG. 2 X |
| 4,259,624 | 3/1981 | Seibicke | 318/443 X |
| 4,398,135 | 8/1983 | Busch et al. | 318/443 |

Primary Examiner—William M. Shoop, Jr.
Assistant Examiner—Shik Luen Paul Ip
Attorney, Agent, or Firm—Welsh & Katz, Ltd.

[57] ABSTRACT

A wiper driving apparatus comprises a speed reduction gear train mounted on a drive shaft of a motor which drives reciprocally and pivotally a wiper blade; a pin member operatively engaged with said gear train so as to move once every rotation of the gear train; a relay switch driven by a relay coil and including a moving contact and fixed contacts disposed opposite sides of the movable contact; an operating lever member for transmitting the movement of the pin member to the movable contact of the relay switch and retaining contact of the movable contact with one of the fixed contacts; and a control circuit including the relay switch and the operating lever member for controlling the driving, intermittent, and automatic stop operations of the wiper blade.

4 Claims, 6 Drawing Figures

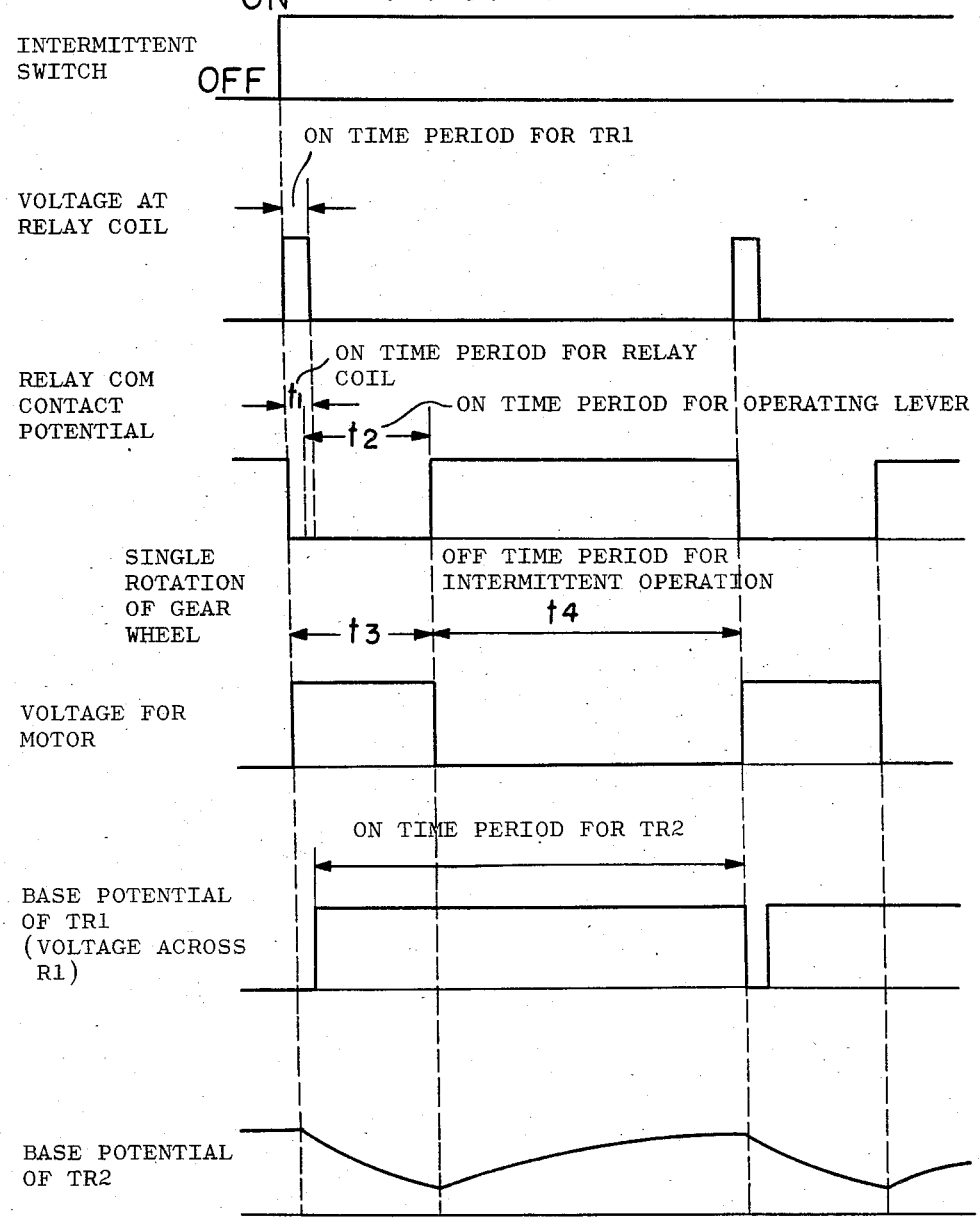

WIPER DRIVING APPARATUS

BACKGROUND OF THE INVENTION

The present invention relates to a windscreen wiper for an automobile, and more particularly, it relates to an improvement on a wiper driving apparatus of the type that both functions to automatically stop the wiper blade at a fixed position and to operate the wiper blade intermittently are provided.

Various types of wiper driving apparatuses for an automobile or the like are known in the art. One of the types, on the one hand, determines an automatic fixed stop position of the wiper blade by means of a metal plate mounted on one side of a reduction gear train which is driven by a wiper motor and a contact lever in operative association with the metal lever and mounted on a housing of the gear train, and on the other hand, in cooperation with the above determining function, operates intermittently the wiper blade by means of an external relay unit which is externally mounted relative to the combined arrangement of the metal plate and the contact lever. Another of the types, on the one hand, determines an automatic fixed stop position by means of a cam formed by providing a difference in relative positions in a reduction gear train and a limit switch, microswitch or the like which is actuated by the cam, and on the other hand, in cooperation with the above determining function, operates intermittently a wiper blade by means of some external relay units.

Conventional wiper driving apparatuses with the above functions have been found, however, not satisfactory in that since the external relay unit and the wiper motor are separately mounted on an automobile and therefore connection is required therebetween with the help of wiring leads, it is ineffective in assembling them on the automobile frame. More in particular, for the former type wiper driving apparatus, connectors and lead wires are required for the relay unit so that the number of components increase. And for the latter type wiper driving apparatus, connectors and lead wires for some external relay units are required so that the same problem as above, that is, increase of the number of components, arises.

Referring now to FIG. 1 wherein a typical prior art control circuit for the wiper driving apparatus is shown, reference number 1 denotes diagrammatically shown switches for actuating a wiper blade, reference number 2 denotes a wiper motor, and reference number 3 denotes a relay unit. In operation, for example, either a particular switch for a low speed command or a particular switch for a high speed command in the wiper switch 1 is turned on, the motor 2 is driven into rotation with the terminal A or B grounded through the wiper switch 1. Thus, a wiper blade coupled for association with the motor 2 through a speed reduction mechanism, crank linkage, or the like, is reciprocally swung.

During high or low speed operation of the wiper blade, upon turning OFF the wiper switch 1, the current having passed through the terminal A or B to ground by way of the particular switch for a low speed or high speed command is terminated. In this case, if a cam switch S1 operatively coupled to the wiper motor 2 is in contact with a contact P at the time instant when the wiper switch 1 is turned OFF, the wiper motor 2 still continues to rotate. This is because that a current is supplied to the wiper motor through a path from a plus power source terminal, wiper motor 2, terminal A, wiper switch 1, terminal b of the relay unit 3, NC contact of a switch S2, terminal C, and to P1 terminal of the switch S1. Alternatively, if the cam switch S1 operatively coupled to the wiper motor 2 is in contact with a contact P2 at the time instant when the wiper switch 1 is turned OFF, the wiper motor 2 stops in this case. This is because that a current supply to the wiper motor 2 is completely terminated and moreover an electromagnetic brake is generated by a closed circuit having a path from one end of the wiper motor 2, contact P2 of the switch S1, NC contact of the switch S2, wiper switch 1, and to the other end of the wiper motor 2.

The intermittent operation is effected by turning on a particular switch for intermittent operation of the wiper switch. In this case, a terminal a of the relay unit 3 is grounded by way of the particular switch for intermittent operation so that a transistor TR1 is turned on to thereby render a relay coil 4 conductive. Then, a movable contact of the relay switch S2 moves to an NO contact.

As a result, the terminal A of the wiper motor 2 for a low speed operation is grounded through a path from wiper switch 1, terminal b of the switch S2, contact NO, terminal a, wiper switch 1, and to ground. Accordingly, the wiper motor 2 is driven at a low speed. The intermittent operation is attained in the following manner.

While the cam switch S1 is in contact with the contact P1, a transistor TR2 becomes turning on so that the transistor TR1 is cut off setting in turn the movable contact of the relay switch S2 at the contact NC. With the relay switch S2 connecting to the contact NC, the wiper motor 2 continues to rotate with a current passing through the terminal C and through the terminal P1 of the cam switch S1 until the wiper blade comes to an automatic fixed stop position. During the rotation, a capacitor C1 is charged in a short time through a small resistor R0.

When the wiper blade comes to the automatic fixed position, the cam switch S1 detects this and the cam switch S2 is set at the contact P2. As a result, the contact P2 and hence the terminal c of the relay unit 3 is supplied with a positive voltage from the power source. Although a path for supplying a sufficient base current for turning on the transistor TR1 is interrupted, a discharge current from the capacitor C1 keeps the transistor TR2 being saturated for a predetermined time, whereby the wiper motor stops for the predetermined time. And after completion of the discharge, the transistor TR2 is turned off to again initiate the actuation of the wiper blade by making the transistor TR1 conductive and hence by moving the movable contact of the switch 2 to the contact NO. The above operation is repeated to achieve an intermittent operation as desired.

It is noted that in a conventional wiper driving apparatus of the type described above, the wiper motor 2 including the cam switch S1 for attaining the automatic fixed stop position and the relay unit 3 including the relay switch S2 are arranged separately from each other so that the structure becomes complicated and the assembly on an automobile is very ineffective.

SUMMARY OF THE INVENTION

It is therefore a principal object of the present invention to provide a wiper driving apparatus in which the number of components are reduced, the assembly thereof is simplified, and the reliability is increased.

According to one aspect of the present invention, there is provided a wiper driving apparatus which comprises a speed reduction gear train mounted on a drive shaft of a motor which drives reciprocally and pivotally a wiper blade; a pin member operatively engaged with the gear train so as to move once every rotation of the gear train; a relay switch driven by a relay coil and including a moving contact and fixed contacts disposed opposite sides of the movable contact; an operating lever member for transmitting the movement of the pin member to the movable contact of the relay switch and retaining contact of the movable contact with one of the fixed contacts; and a control circuit including the relay switch and the operating lever member for controlling the driving, intermittent, and automatic stop operation of the wiper blade.

Other objects and advantages of the invention will become apparent during the following discussion of the accompanying drawings wherein:

BRIEF DESCRIPTION OF THE DRAWINGS

FIG. 6 is a timing chart for discussing the operation of the circuit shown in FIG. 5.

DETAILED DESCRIPTION OF THE PREFERRED EMBODIMENT

The present invention will not be described with reference to a preferred embodiment shown in the accompanying drawings.

Figure 1:
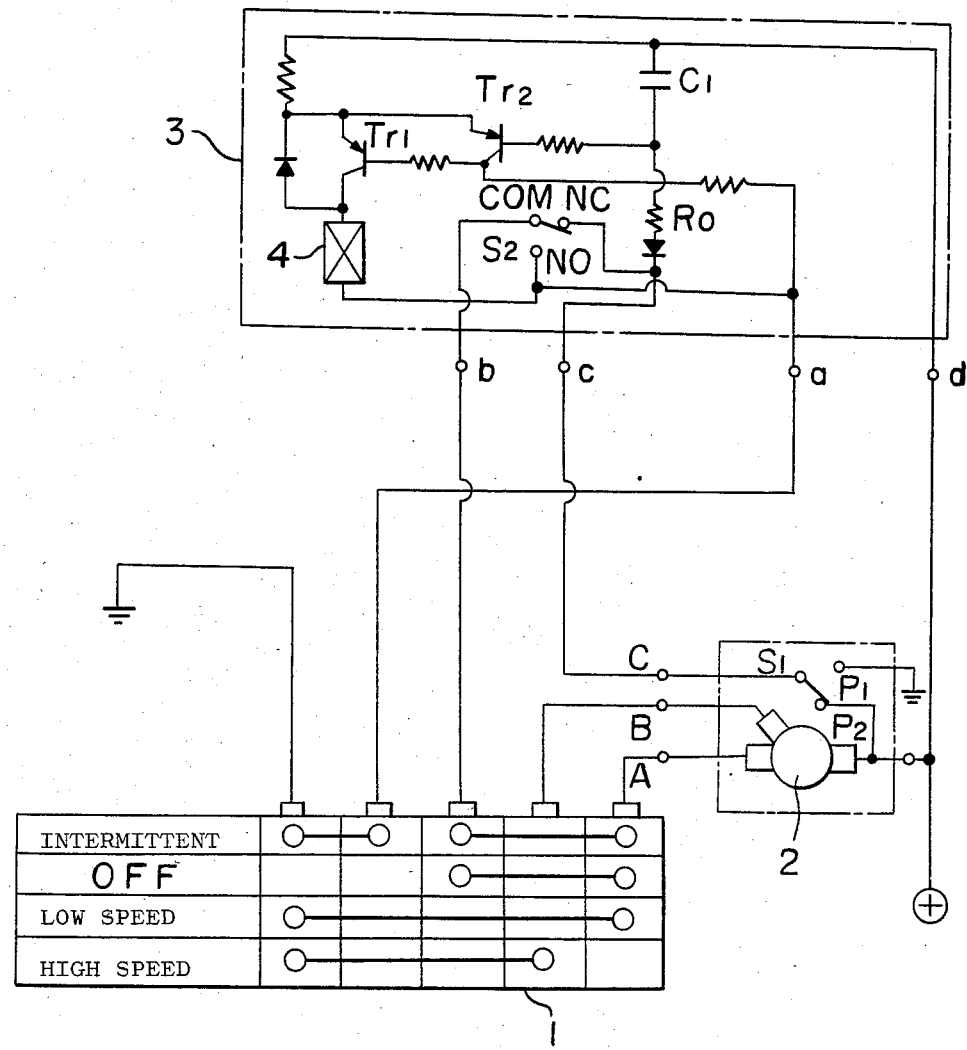
FIG. 1 is a typical circuit diagram for a prior art wiper driving apparatus.
Figure 2:
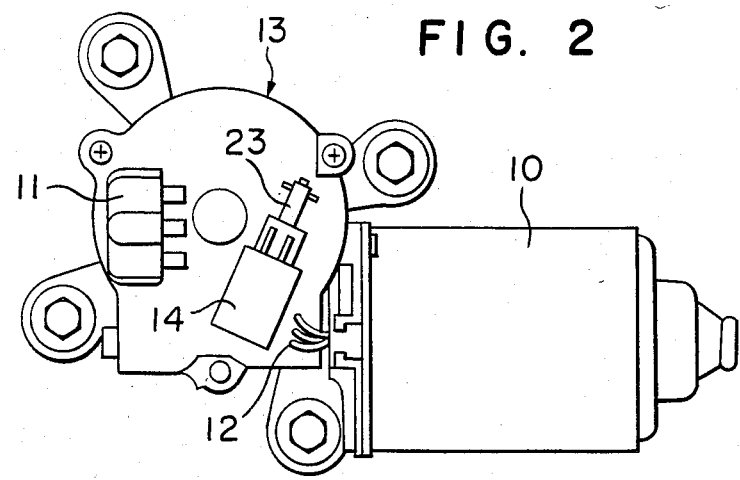
FIG. 2 is a side view of a wiper driving apparatus according to an embodiment of the present invention.
Figure 3:
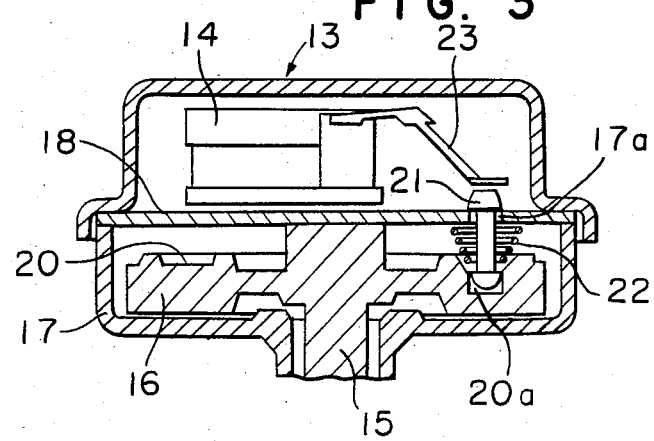
FIG. 3 is a vertical section of a main part of the wiper driving apparatus shown in FIG. 2.
Figure 4:
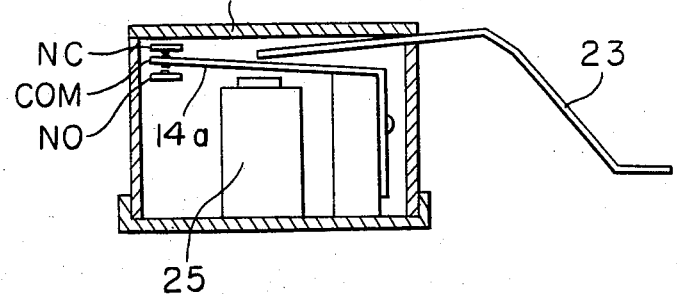
FIG. 4 is an enlarged section of a main part of a relay.

In FIGS. 2 to 4, reference number 10 denotes a wiper motor, reference number 11 denotes a connector for connection to a not shown external switch and a power source, reference number 12 generally denotes lead wires partially shown for connection to the wiper motor 10, reference number 13 denotes a relay unit integrally mounted on the wiper motor 10, and reference number 14 denotes a relay with a lever by which the relay contacts can mechanically be actuated.

The wiper motor 10 is coupled to a not shown speed reduction mechanism. An output shaft 15 of the speed reduction mechanism such as a gear train is integrally formed with a gear wheel 16, which is accommodated within a gear housing 17 with a lid 18 covering the upper portion thereof. On the lid 18, there are mounted the relay 14 with a lever and other electronic components required for a control circuit for the wiper driving apparatus. Thus, the relay unit 13 including the relay 14 and other components is unified with the wiper motor 10 by means of the lid 18, and a cover 19 is provided thereupon.

The gear wheel 16 is formed with a circular groove 20 generally of a rectangular shape in section and concentrically disposed about the output shaft 15, the circular groove 20 being formed in the gear wheel surface at the side nearer to the lid 18. The circular groove 20 is partially formed with a deeper groove, or engaging portion 20a.

The lid 18 is formed with a pin hole 17a at the position corresponding to the circular groove 20 of the gear wheel 16. A pin 21 is inserted through the pin hole 17a, and is biased to move toward the groove and the engaging portion 20a by a spring force exerted by a spring 22. During rotation of the gear wheel 16, the pin 21 therefore protrudes while engaging with the circular groove 20, and submerges while engaging with the engaging portion 20a.

The head of the pin 21 is adapted to engage with one end of an operating lever 23 of the relay 14 which lever 23 is pivotally supported in order for the other end to actuate the movable contact 14a, whereby fixed NC and NO contacts can selectively be connected to the movable contact 14a.

The lid 18 of the gear housing 17 is preferably made of a printed circuit board on which the electronic components of the control circuit, such as transistors, resistors, diodes, choke coil or the like, and the relay 14 with the operating lever 23, are mounted thereby enabling electrically controlling the wiper motor 10 via the lead wires 12.

Figure 5:
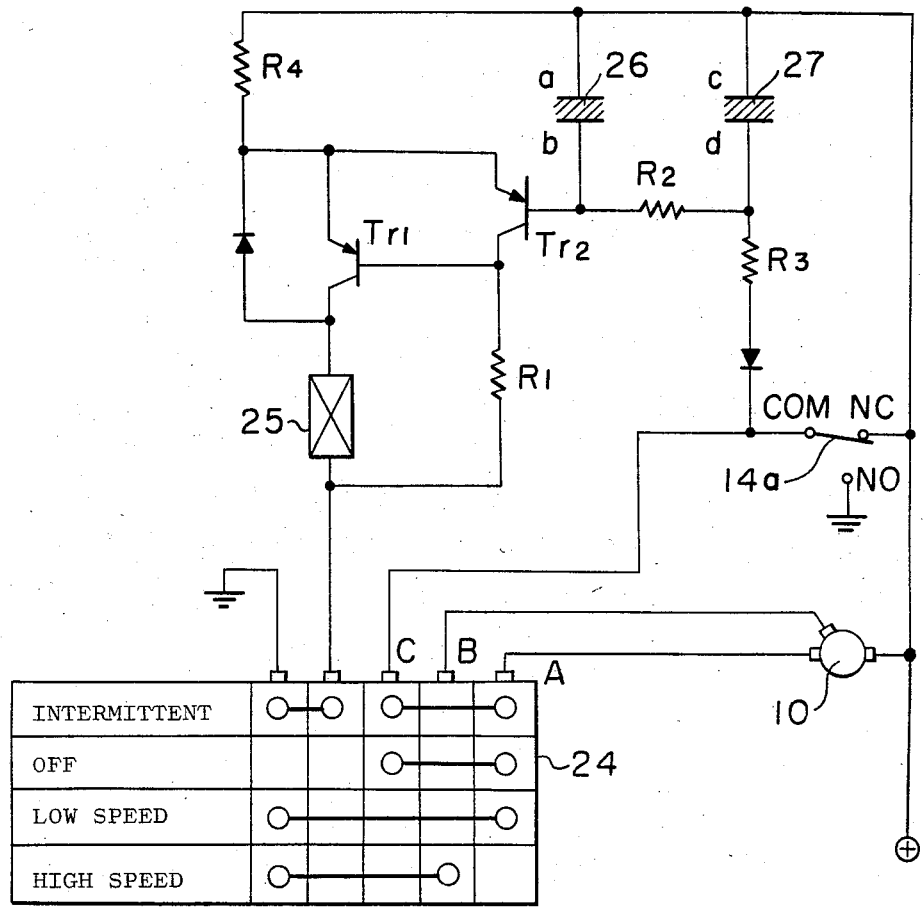
FIG. 5 is a control circuit according to an embodiment of the present invention.

Next, the operation of the wiper driving apparatus having the wiper motor 10 and the relay unit 13 thus integrally constructed will be described with reference to the control circuit diagram of FIG. 5 and the timing chart of FIG. 6.

First, in a low speed or high speed operation, a particular switch in a manual switch 24 is selectively actuated so as to supply current to the wiper motor 10 through a low speed terminal A or high speed terminal B. In this case, although the operating lever 23 forces the movable contact 14a of the relay unit 13 to contact with the NC contact once every one rotation of the gear wheel 16, in this embodiment there is no influence on the supplying current to the wiper motor 10, as is self explanatory from the circuit diagram.

Next, upon actuating the manual switch 24 so as to obtain an intermittent operation, it is ensured to ground the circuit through the manual switch 24 so that a transistor TR1 is turned on to flow current through a relay coil 25 of the relay 13. Therefore, the movable contact 14a is attracted to the NO contact to attain an electrical connection to its COM contact during an electrical on time period (t1) shown in FIG. 6. During this time period, capacitors 26 and 27 are charged and a transistor TR2 is turned on. As a result, the transistor TR1 which has been turned on until then is turned off. Therefore, in an electrical sense, the movable contact 14a should return to its original contact, that is, to the NC contact. However, since the wiper motor 10 has rotated during the time period (t1), the movable contact 14a is mechanically moved to contact with the NO contact by the operating lever 23. In other words, the pin 21 which has been engaged with the engaging portion 20a is pushed up to the circular groove 20 as the wiper motor starts rotate at a low speed. This condition continues during a mechanical ON time period (t2) shown in FIG. 6. Therefore, the wiper motor 10 continues to rotate during a time period (t3) until the pin 21 again reaches the engaging portion 20a after one rotation of the gear wheel 16. When the pin 21 comes in engagement with the engaging portion of the gear wheel 16, the wiper motor 10 stops at that time.

With the movable contact 14a connecting to the NC contact, although a supply for a base current for the transistor TR2 through the power source is terminated, a discharging current through the capacitors 26 and 27 maintains the transistor TR2 conductive. And after a certain waiting time (t4), the transistor TR2 becomes unable to retain its on-state and turns off, as shown in FIG. 6. As a result, the transistor TR1 turns on at that time instant. The above operation is repeated to attain a desired intermittent wiper blade drive.

Upon actuation of the manual switch 24 to a stop command during the above low speed, high speed, or intermittent drive of the wiper motor 10, an automatic stop operation at a fixed position can be achieved. More particularly, at a time instant when the manual switch 24 is actuated, if the pin 21 is on the circular groove 20, then the wiper motor 10 is supplied with a current through a path from the terminal C of the manual switch 24, movable contact 14a, NC contact, and to ground. Therefore, the wiper motor 10 continues to rotate until the pin 10 comes in engagement with the engaging portion 20a.

Having described the present invention as related to the embodiment shown in the accompanying drawings, it is our intention that the invention be not limited by any of the details of description, unless otherwise specified, but rather be construed broadly within its spirit and scope as set out in the accompanying claims.

What is claimed is:

1. A wiper driving apparatus comprising:
   a motor having a drive shaft rotating about an axis;
   a speed reduction gear train mounted for following rotational motion to said drive shaft for driving a wiper blade in a reciprocal and pivotal manner across a vehicle windshield;
   a cam means affixed for following rotational motion to said gear train, said cam means having a camming surface;
   a pin member having a longitudinal axis and one end operatively engaged with said camming surface, said camming surface causing movement of said pin along its longitudinal axis from an operative position to an inoperative position;
   a relay switch driven by a relay coil and including a movable contact and fixed first and second contacts disposed on opposite sides of said movable contact;
   an elongated operating lever member being positioned for contact at a first end with said pin member when said pin member is in said operative position;
   an opposite end of said lever member thereby biasing said movable contact into electrical connection with said first contact when said pin member is in said operative position;
   said movable contact being out of contact with said second contact and in contact with said second contact when said pin member is in said inoperative position and said relay switch is not being driven by said relay coil; and
   a control circuit including said relay switch and said operating lever member for controlling the driving, intermittent, and automatic stop operations of the wiper blade.

2. A wiper driving apparatus according to claim 1, wherein said motor, said speed reduction gear train and said relay switch are integrally formed.

3. A wiper driving apparatus according to claim 1, wherein said pin member is moved along its longitudinal axis once every rotation of said gear train by said camming surface.

4. A wiper driving apparatus according to claim 3, wherein said camming surface comprises a groove formed in a gear wheel coupled to said gear train.

* * * * *